Figure 1:
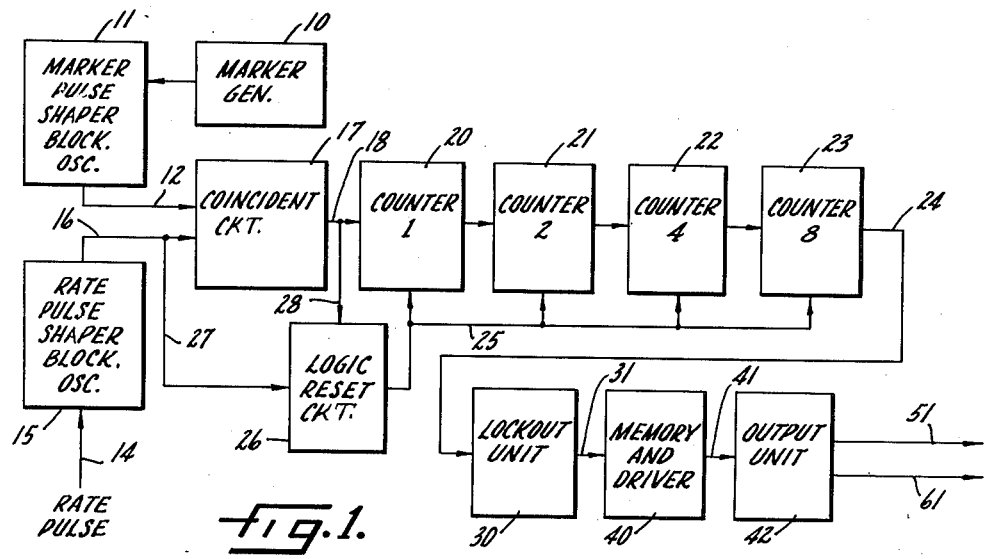

Sept. 14, 1965　　　　C. F. DER ET AL　　　　3,206,684
DYNAMIC RANGE RATE GENERATOR TESTER
Filed Jan. 10, 1962

INVENTORS.
CHUCK F. DER
LEO J. HICKEY
WARREN T. O'REILLY
BY
H. N. Losche
ATTORNEYS.

United States Patent Office  3,206,684
Patented Sept. 14, 1965

3,206,684
DYNAMIC RANGE RATE GENERATOR TESTER
Chuck F. Der, Baltimore, Leo J. Hickey, Sillery Bay, Pasadena, and Warren T. O'Reilly, Ellicott City, Md., assignors, by mesne assignments, to the United States of America as represented by the Secretary of the Navy
Filed Jan. 10, 1962, Ser. No. 165,465
11 Claims. (Cl. 328—110)

This invention relates to a means to dynamically test the accuracy of the frequency of range rate generators for testing radar ranging systems and more particularly to a circuit combination for comparing the radar range rate frequency generations with a marker frequency for producing samples of compared frequency to develop on and off signals for an accurate external timer or time counter.

There has been a long felt need for a means to dynamically test the range rate generators used for testing radar ranging systems. These range rate generators are commercially available, such as, for example, the Range, Range-Rate Calibrator, Model 312D, produced by the Missouri Research Laboratories, Incorporated, and fully disclosed in their Handbook therefor. These devices may also be referred to as target range rate simulators. Most range rate generators perform their function by inserting a fast sweep, triggered by the range radar trigger or pulse repetition frequency (PRF), and a slow sweep into a voltage comparator which provides an output signal when the voltages are equal as does the Missouri Research Laboratory model. Evaluation of a target closing at a constant rate of such a range rate circuit has previously been made by statically measuring the linearity of the fast sweep and the slow sweep separately and assuming that they marry in the voltage comparator in precisely that manner. This means of testing the range rate generator has serious limitations in that it is slow and tedious, measurement of the slow sweep is made at a different time than that of the fast sweep, it assumes the principle of super position, i.e., the response of the total circuit is equal to the sum of the responses of the various components acting separately, and it requires complicated setups and varieties of test equipment completely unsuited for field application. This means of range rate generator testing is further complicated when accelerating targets are programmed. Another means of range rate generator testing is by utilizing simulated moving targets of known range changes to verify the range tracking circuitry, but this means of testing the range rate generator can only be as accurate, at most, as the target simulated.

In the present invention a dynamic range rate generator or calibrator tester has been devised utilizing the pulse output from a marker generator, or the like which produces pulses of a precise and exact pulse repetition rate. Pulses from the marker generator source are compared with the pulses of the range rate generator or calibrator source and these are time compared in a time comparator or coincidence circuit to produce coincidence pulses whenever there is coincidence of the range rate and marker pulses; that is, coincidence pulses will occur only upon the simultaneous occurrence of the marker and rate pulses. The coincidence pulses are counted in a counter circuit, such as a binary counter, and the counter will produce an output whenever its maximum count is reached. A skip reset circuit receiving the rate pulses and the coincidence pulses will operate to reset the counter circuit whenever a rate pulse is applied to the skip reset circuit in the absence of a coincidence pulse from the coincidence circuit. The skip reset circuit will produce no reset output voltage if both a rate pulse and a coincidence pulse are applied thereto and will likewise produce no output reset voltage with the occurrence of a coincidence pulse in the absence of a rate pulse. The skip reset circuit operates in the manner of a logic circuit for a certain condition must be met before any output voltage signal is produced. The output of the counter circuit is applied to a lock-out unit, a memory driver circuit, and an output circuit in sequence to utilize the counter output pulses to produce "start" and "stop" output signals for starting and stopping an external timer or time counter. The external time counter is capable of accurately timing the occurrence of the range rate pulses with respect to the marker pulses to thereby check the accuracy of the range rate pulses for a predetermined range simulation. It is therefore a general object of this invention to provide a combination of circuit components co-operating in a manner to compare the range rate pulses of a range rate generator or calibrator with accurately timed marker pulses to provide "start" and "stop" output signals effectively operative to accurately trip an external time counter means for measuring the time taken for each range rate pulse to pass from one marker pulse to another and thereby dynamically test the range rate generator or calibrator. This means of accurately timing the coincidence of rate pulses with a standard of known marker pulse frequency provides accurate timing of the rate pulses for predetermined target simulations which rate pulses may then be used for accurate testing of radar range circuits.

Figure 2:
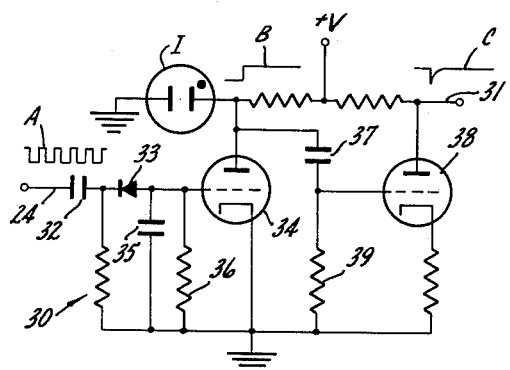
Figure 3:
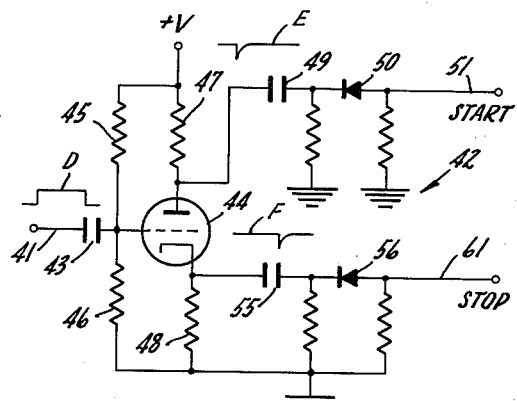
Figure 4:
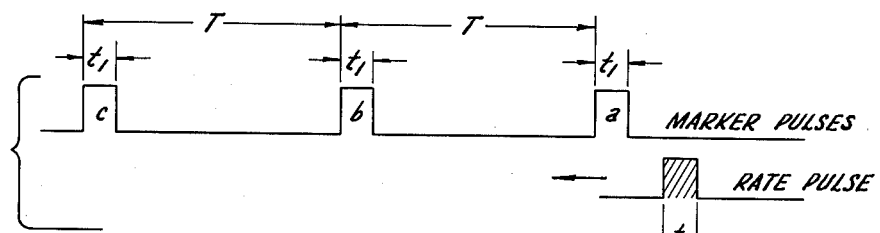

These and other objects and the attendant advantages will become more apparent to those skilled in the art as the description proceeds when taken with the accompanying drawing in which:

FIGURE 1 is a block circuit diagram of the invention illustrating the functional lines of communication, FIGURE 2 is a circuit schematic diagram of one of the blocks of FIGURE 1, FIGURE 3 is a circuit schematic diagram of another of the blocks of FIGURE 1, and FIGURE 4 is a view showing one relationship of the marker pulses with a closing target rate pulse.

Referring more particularly to FIGURE 1, a marker pulse generator 10 of any well-known design for producing an accurate pulse repetition frequency, as by crystal control thereof, or the like, applies these pulses through a marker pulse shaper and blocking oscillator circuit 11 of any well-known design to shape the pulses into clean positive rectangular output pulses on the output 12. The blocking oscillator is designed to accept either positive or negative marker pulses from the marker generator 10. Range rate pulses from a range rate generator or calibrator to undergo tests are applied by way of the conductor means 14 through a rate pulse shaper and blocking oscillator circuit 15 of any well known conventional design to shape the rate pulses into clean positive rectangular pulses over the output 16. The outputs of the marker pulse and rate pulse blocking oscillators are applied to a time comparator circuit or coincidence circuit 17 of any well-known design to produce coincidence pulses on the output 18 thereof whenever there is coincidence of the marker pulses and rate pulses applied at the inputs 12 and 16. It is to be noted that when comparisons or coincidences occur, they do so at the PRF of the rate pulses applied over the conductor means 14.

The coincidence pulses of the coincidence circuit are applied from the output conductor means 18 to the first of a series of counter circuits, herein illustrated for the purpose of example but not in any way limiting, to four binary counters which are in essence designated 1, 2, 4, and 8, representative of the binary numbers 1, 2, 4, and 8, of the base 2 to the binary power as is well understood by those skilled in the binary counter art. The binary counters designated herein by the reference characters 20, 21, 22, and 23, may be of the conventional bistable multivibrator type in series, which may be well understood will make a count to the maximum decimal number eight. When the fourth binary counter 23 trips from the "zero" to the "one" state designating a decimal count of eight or a binary count of 1 0 0 0, an output pulse will be produced on the output 24 of binary counter 23. The binary counters 20 through 23 produce a cyclic count every sixteen counts; that is, when the counters 20 through 23 are all in a zero state and a count of pulses from output 18 begins, the first decimal count of eight will produce an output on the output conductor 24. The next decimal count of eight will operate to return the fourth counter 23 from the "one" state to the "zero" state, or the binary number of 0 0 0 0, which in a sense resets the binary counters 20 through 23 to the "zero" state. Thereafter it will take a decimal count of eight more pulses to return the fourth counter 23 to the "one" state. A reset bus 25 connects each of the four counters 20 through 23 to reset these counters to the "zero" state, regardless of whether they are individually in the "zero" or "one" state, by the application of a pulse to this reset bus 25. The reset bus 25 is coupled as an output of a skip reset or logic reset circuit 26 having inputs by way of conductor means 27 from the output of the rate pulse blocking oscillator 16 and by way of conductor means 28 coupled to the output conductor means 18 of the coincidence circuit 17. The logic reset circuit 26 may be of any known type of "and" and "or" gate circuit or tube circuit which will perform the function of producing an output pulse on the reset bus 25 whenever a rate pulse is applied over the conductor means 27 in the absence of a coincidence pulse over the conductor means 28. The logic reset circuit 26 may be better expressed by the following logical quanlities of $$R \cdot C = 0$$
$$\overline{R} \cdot \overline{C} = 0$$
$$R \cdot \overline{C} = 1$$

Where R is the rate pulse, C is the coincidence pulse, and the bar over either the R or C indicates the absence of a pulse. The dot between the letters is read as "and" in binary parlance. Bearing in mind that the counter group 21 through 23 is to count eight consecutive coincidences before transmitting an output pulse, the logic reset circuit is required to reset the counter group to zero whenever a comparison or coincidence is missed; that is, a reset pulse will be produced whenever a rate pulse occurs without the generation of a coincidence pulse, to reset the counter group to zero, such as given in the example $$R \cdot C = 1$$

This is to assure the actual counting of the coincidence of the rate and marker pulses to eliminate the effects of spurious comparisons created by jitter of the range rate pulses. As the rate pulse generator may produce pulses that have some degree of jitter, erroneous indications could be displayed on a counter group because the dynamic range rate generator tester is actuated by the initial time coincidence, and the excursion of the pulse may bear no fixed relationship to the mean position of the pulse. Consequently, consecutive coincident pulses must be produced from the marker and rate pulses to the minimum count of eight before the counter group will produce an output pulse, and as soon as the coincident pulse is missed, the counter group will be reset to zero. Counter group 20 through 23 is shown and described herein for four counters to count through the decimal count of eight although the number of counters is flexible and a more or less number could be used, as desired.

The output of the fourth counter 23 is conducted by way of the output conductor means 24 to a lock-out unit 30 shown schematically in FIGURE 2. The lock-out unit is a gate circuit which permits only the first output pulse from the group counter to be transmitted through its output 31 during the period of time it takes the rate pulse to pass by any one marker pulse. As best seen in FIGURE 4 the marker pulses recur at an accurate periodical frequency of a time T. For the purpose of example let it be assumed that $T = 10$ microseconds
$t_1 = .5$ microsecond
$t_2 = .5$ microsecond
600 knot rate—closing-for target
PRF = 1000 cycles per second = 1 kilocycle per second The marker frequency can be derived from the following:

$$\text{Frequency} = \frac{1}{\text{period}} = \frac{1}{T} = \frac{1}{10 \text{ microseconds}} =$$

$$\frac{1}{10 \times 10^{-6} \text{ seconds}} = 100 \text{ kilocycles per second}$$

As viewed in FIGURE 4 the rate pulses are recurring at a much lower frequency than the marker pulses and, for a closing target, are recurring and traveling in the direction shown by the arrow. With the conditions given in the above example, it takes 4,850 milliseconds for the leading edge (left edge) of the rate pulse to pass from the trailing edge (right edge) of the marker pulse (a) to the trailing edge (right edge) of the marker pulse (b), as derived in the following manner:

$$\frac{600 \text{ knots per hour}}{60 \times 60} = .166 \text{ knot per second}$$

Since it takes 12.36 microseconds for light to travel one nautical mile, $.166 \times 12.36 = 2.06$ microseconds per second for the closing rate of the target.

Then, $$\frac{10 \text{ microseconds } (T)}{2.06 \text{ microseconds per second}} = 4.85 \text{ seconds}$$

or 4850 milliseconds for the leading edge of the rate pulse to pass from the trailing edge of the marker pulse (a) to the trailing edge of the marker pulse (b). As the rate pulse has a width of .5 microsecond, the marker pulse has a width of .5 microsecond, and the marker pulse period is 10 microseconds, the rate and marker pulses comprise ten percent of the time T, causing coincidence of some portion of the rate and marker pulses for 485 milliseconds for each period of 4,850 milliseconds that it takes for one rate pulse to pass from one marker pulse to another. This means that the coincidence circuit produces 485 output pulses on the conductor means 18 as the rate pulse passes by the marker pulse (a). This, then, will produce a series of coincidence pulses corresponding to the marker pulses, in cycles, each time the rate pulse passes by one marker pulse (a), (b), or (c). As stated above, we count eight coincidence pulses before transmitting an output pulse on 24 from the counter group 20 through 23 and then one every succeeding 16 comparisons. In 485 comparisons this should produce 31 pulses from the counter group 20 through 23 on the output conductor means 24. Since it is only desirable to have an accurate count of the coincidences of one rate pulse with one marker pulse, the lock-out unit 30 is designed to pass only the first of each series of pulses produced by the rate pulse passing each of the marker pulses (a), (b), or (c), et cetera. The input of such a series of pulses is represented by (A) over the input conductor 24 of the lock-out unit 30 in FIGURE 2. This input 24 is through a coupling capacitor 32 and a diode 33 to the grid of a triode tube 34. The grid of the triode 34 is coupled in parallel through a charging capacitor 35 and a discharging resistor 36 to ground. The anode of the triode 34 is coupled through a capacitor 37 to the grid of a triode 38, this grid also being coupled to ground through a resistor 39. The output of the lock-out circuit 30 is from the anode of triode 38 over the output conductor 31. As the first of the series of negative pulses in the output of the counter group is applied to the grid of the triode tube 34, this tube is immediately cut off and the capacitor 35 charged negatively to maintain the tube cut off so that the remainder of the negative (A) pulses are blocked or locked out from passing through the triode tube 34. The first pulse (A), producing cut-off of the triode tube 34, produces a positive wave (B) on the anode thereof which is substantially differentiated by the capacitor 37 and the resistor 39 and applied to the grid of triode 38 to produce conduction of tube 38 momentarily to produce the negative voltage trigger C on the output 31 of this lock-out unit 30. The time constant of the capacitor 35 and discharging resistor 36 are such that the series of pulses, caused by the rate pulse passing one marker pulse producing the 485 coincidence pulses on the output 18 of the coincidence circuit 17 to thereby produce 31 output pulses on the output conductor 24 of the counter group, will cause the lock-out unit to pass only the first of the series of 31 pulses. The remainder of the 30 pulses will be locked out by virtue of the negative bias of the capacitor 35 but the resistor 36 will discharge the capacitor 35 in the noncoincidence state between the marker pulses (a) and (b), (b) and(c), et cetera. The lock-out circuit may have an indicator lamp therein to indicate the lock-out and nonlock-out conditions thereof. The circuit of FIGURE 2 is illustrative of one lock-out circuit and is not intended to be in any way limiting the invention to this circuit since other circuits accomplishing the same results and functions may be used as well.

The output conductor of the lock-out unit 30 is applied as an input to a memory and driver circuit 40 which is designed to remember whether the next pulse to be transmitted to the external time counters should be a "start" pulse or a "stop" pulse. The memory and driver circuit is a normal and well-known bistable multivibrator circuit which flips each time it receives a pulse from the lock-out unit 30. One state of the multivibrator is the "start" state while the other state is the "stop" state. The output of the memory and driver circuit is by way of the conductor means 41 to an output circuit 42 which is designed to take the output of the memory and driver unit and convert the transitions of the memory and driver unit from the "start" state to the "stop" state, and vice versa, into output pulses suitable to drive digital time counters external to this dynamic range rate tester.

The output unit 42 is shown in circuit schematic form in FIGURE 3 in which the output conductor 41 of the memory and driver circuit 40 is applied as an input through a coupling capacitor 43 to the grid of a triode tube 44. The grid of the triode 44 is connected in a voltage divider circuit consisting of resistors 45 and 46 coupled between a positive potential source and ground. This voltage divider circuit maintains triode tube 44 in a threshold conductive state. The anode is coupled through an anode resistor 47 to a positive voltage source and the cathode of the triode 44 is coupled through a cathode resistor 48 to ground. One output of the output circuit 42 is taken from the anode of the triode 44 through a coupling capacitor 49 and a diode 50 to an output conductor 51, herein designated as carrying the "start" signal to the external time counter. In like manner, the cathode of the triode 44 is coupled through a capacitor 55 and a diode 56 to an output conductor 61, herein identified as the conductor for carrying the "stop" signal to the external time counter. The output of the multivibrator circuit in the memory and driver unit 40 will produce a voltage of two states as indicated by the waveform (D) over the conductor means 41. The capacitor 43 and resistor 46 will operate as a differentiating circuit to produce the negative pulse E on the anode of triode 44 for the leading edge of the input wave D, and will produce the output F on the cathode for the trailing edge of the input wave D. The voltage signals E and F will therefore be conducted over the output conductors 51 and 61 as the "start" and "stop" signals for the external time counter. It is to be understood, however, that other equivalent circuits capable of providing the functions and results of the output circuit 42 illustrated may be used at will. In this manner the external time counter can make an accurate count of the time taken for the rate pulse to pass from one marker pulse to another whereby the range rate pulses may be tested for accuracy. For example, where the time interval between marker pulses is 10 microseconds, the radar distance or range would be 1640 yards. This time is a measure of the velocity of the rate generator signal and accordingly, the external time count can accurately time the rate pulse by the "start" and "stop" signals produced by the dynamic range rate tester circuit herein. By using two time counters, adjacent incremental distances can be measured; that is, by having one time counter connected to start while the other timing counter is signaled to stop, each time counter will time the alternate incremental spacing of rate pulse and marker pulse coincidence. It is also to be understood that complete control of the magnitude of the incremental distances is possible by changing the frequency of the markers, e.g., 5 microsecond markers will provide 820 yard increments.

*Operation*

In the operation of this invention let it be assumed that the marker generator is producing accurate pulses at the repetition frequency of 10 microseconds between pulses, as hereinabove given in an example. The range rate pulse is applied by way of conductor 14 from the radar range rate circuits. Let it be assumed that the range rate pulses are for a closing target as shown in FIGURE 4. The coincidence of these pulses will be determined in the coincidence circuit 17 to produce coincidence output pulses on the output 18 to the counter group 20 through 23. With the PRF rate of the range pulses of 1000 showing a 600 knot closing rate, 485 coincidence pulses will be produced on the output 18 as the rate pulse passes each marker pulse, since both the marker pulses and rate pulses each have a finite width of .5 microsecond. If any one of these coincidence pulses in the series surrounding each marker pulse is missed, the logic reset circuit 26 will immediately reset to start a new count to insure that only coincidence of marker pulses and rate pulses are being counted. In this manner the actual coincidence of marker and rate pulses will be counted in the counter circuit 20–23 and any counts started by spurious comparisons will be removed from the counter by the reset circuit 26. Accordingly, it is assured that only true coincidence pulses of rate and marker pulses will be counted. The counter circuit 20 through 23 will produce an output pulse on the output 24 for the first count of eight after being reset and thereafter every sixteen counts, producing thirty-one counts from the output of the counter group 20 through 23 from each series of coincidence of the marker and rate pulses. The lock-out circuit will accept and pass only the first of each series of 31 counts corresponding to each marker pulse which will produce an output to the memory and driver circuit 40. Since the memory and driver circuit is in one bistable condition, the next succeeding pulse on the output 31 from the lock-out unit 30 will reverse this bistable state to produce either a "start" or a "stop" output signal on the output conductors 51 or 61. That is, if the "start" signal (E) has been produced on the output circuit 51 the next succeeding output pulse from the output unit 30 will trip the bistable multivibrator circuit of the memory and driver circuit 40 to the opposite state to produce the (F) output pulse on the output circuit 61 of the output unit 42. By this operation the output pulse (E) will occur for the first coincidence of the rate pulse with the marker pulse such as marker pulse (a) in FIGURE 4, and the (F) pulse will occur upon the first coincidence of the rate pulse with the marker pulse (b), and so on as the rate and marker pulses continue to appear. The "start" and "stop" signals over the output conductors 51 and 61 therefore produce accurate "start" and "stop" signals for an external time counter in accurately counting the time that it takes the range pulse to proceed from one marker pulse to another. The operation would be the same for an opening target where the rate pulse would move outwardly in FIGURE 4 for targets accelerating away from ownship or interceptor carrying the dynamic range rate tester equipment. Since the marker pulses are of predetermined and known time intervals the range rate can be accurately tested dynamically in the operation of the radar system.

While many modifications and changes may be made in the constructional details and features of the invention hereinabove described without departing from the spirit and scope of this invention, we desire to be limited only by the scope of the appended claims.

We claim:

1. A circuit combination for use in a rate generator tester circuit comprising:

counting means for counting the coincidence of rate pulses of a rate pulse source and the pulses of a periodic pulse source to produce coincidence pulses which are counted to the limit of said counting means, each limited count of said counting means producing a pulse on an output thereof, a series of counting means output pulses constituting a cycle of coincidence pulses produced by the rate pulses being in time coincidence with each periodic pulse;

counter resetting means coupled to said counting means for resetting said counting means whenever a rate pulse occurs in the absene of a coincidence pulse;

a lock-out circuit means coupled to the output of said counting means for passing the first output pulse of said counting means corresponding to each cycle of coincidence pulses and for locking out the remainder of output pulses for the same cycle of coincidence pulses; and output means coupled to the output of said lockout circuit means for producing two alternate ouput signals for consecutive output pulses from said lock-out circuit whereby the alternate output pulses provide a means for testing the rate pulses from one cycle of coincidence pulses to the next cycle of coincidence pulses by time counter means.

2. A circuit combination for use in a rate generator tester circuit comprising:

counting means for counting the coincidence of rate pulses of a rate pulse source and the pulses of a periodic pulse source to produce coincidence pulses for each coincidence of rate and periodic pulses, said rate pulses being of substantially lower frequency than said periodic pulses, and said counting means producing an output coincidence pulse after a predetermined count of coincidence pulses, the number of output coincidence pulses ending with each cycle of rate pulses being in time coincidence with each periodic pulse;

a counter resetting means coupled to said counting means for resetting said counting means for any failure to produce a coincidence pulse when a rate pulse and a periodic pulse are applied to said counting means;

a lock-out circuit means coupled to said counting means for passing the first output coincidence pulse count output of said counting means corresponding to each cycle from one periodic pulse to the next and for locking out the remainder of said output coincidence pulse counts during said cycle of a corresponding periodic pulse on an output thereof; and output means coupled to the output of said lock-out circuit means for producing two alternate output signals for consecutively passed output coincidence pulse counts from said lockout circuit whereby the alternate output signals provide a means for testing the rate pulses by time counter means.

3. A circuit combination for use in a rate generator tester circuit as set forth in claim 2 wherein said counting means for counting the coincidence of rate pulses of a rate pulse source and the pulses of a periodic pulse source includes a coincidence circuit receiving a rate pulse input and a periodic pulse input to produce a coincidence pulse upon coincidence of the input pulses, and a counter circuit for counting the coincidence circuit output pulses.

4. A circuit combination for use in a rate generator tester circuit as set forth in claim 3 wherein said counter resetting means is a logic circuit having the rate pulses and the coincidence pulses from said coincidence circuit applied as inputs thereto and the output thereof applied to reset said counter circuit, said logic circuit being a gating circuit to produce an output pulse only upon the occurrence of a rate pulse in the absence of a coincidence pulse.

5. A circuit combination for use in a dynamic range rate generator tester circuit comprising:

a rate pulse input circuit;

a marker pulse input circuit;

a coincidence circuit coupled to receive said rate pulse and marker pulse inputs to produce an output coincidence pulse on an output thereof upon coincidence of each rate pulse and marker pulse, a series of coincidence pulses being produced in repeated cycles as each series of rate pulses appear for each succeeding marker pulse;

a pulse counter means coupled to the output of said coincidence circuit to produce a count pulse upon reaching a predetermined count;

a logic reset circuit coupling the rate pulse input and the coincidence circuit output and having an output coupling said pulse counter means to reset said counter means whenever a rate pulse occurs in the absence of an output from said coincidence circuit;

a lock-out unit coupled to the output of said pulse counter means to pass the first count pulse of each cycle of counts corresponding to each marker frequency pulse; and output means coupled to the output of said lock-out means to produce alternate output signals for succeeding first count pulses passed by said lock-out circuit whereby the rate pulse source is tested to the exclusion of spurious pulses.

6. A circuit combination for use in a dynamic rate generator tester as set forth in claim 5 wherein said output means includes a memory and driver circuit coupled to the output of said lock-out unit to produce said alternate signals on an output thereof in correspondence with the consecutive first count pulses from said lock-out circuit, and includes an output circuit coupled to the output of said memory and driver circuit to produce an output signal on each of two outputs corresponding to each alternate signal.

7. A circuit commbination for use in a dynamic rate generator tester as set forth in claim 6 wherein said logic reset circuit is a gating circuit means to prevent an output signal therefrom whenever a coincidence circuit pulse and a rate pulse occur, to prevent an output signal therefrom whenever a coincidence circuit pulse occurs in the absence of a rate pulse, and to produce an output pulse whenever a rate pulse occurs in the absence of a coincidence circuit pulse.

8. A circuit combination for use in a dynamic range rate generator tester circuit comprising:

a range pulse rate source to be tested;

a marker pulse source providing periodic sequential pulses of substantially higher frequency than said range pulse rate of said source;

a pulse coincidence circuit coupled to receive pulses from said range rate source and from said marker pulse source to provide periodic series of coincidence pulses on an output thereof, said periodic series of coincidence pulses coinciding with the coincidence of said rate pulses and each marker pulse;

a pulse counter circuit having a resest input and having an input coupled to the output of said coincidence circuit to count the coincidence pulses to a predetermined amount at which time of predetermined count a counter output pulse is produced on an output thereof;

a logic reset circuit coupled to said range rate source and to the output of said coincidence circuit with an output coupling the reset input of said counter circuit, said logic reset circuit being a gating circuit to produce an output pulse only when a rate pulse is present at the same time that a coincidence pulse is absent to reset said pulse counter circuit;

a lock-out circuit having an input coupled to said counter circuit output to produce an output pulse on an output of said lock-out circuit for the first only of each periodic series of counter output pulses corresponding to the coincidence of range rate pulses with each marker pulse;

a memory and driver circuit coupled to receive the output pulses from said lock-out circuit to produce alternate pulse signals on an output thereof in sequence with the input pulses; and an output circuit coupled to the output of said memory and driver circuit to produce one of the alternate pulse signals over one output thereof and the other alternate pulse signal over another output thereof whereby the range pulse rate source is utilized for the production of two output pulse signals for starting and stopping a timing circuit to test the frequency of the range pulse rate source.

9. A circuit combination for use in a dynamic range rate generator tester as set forth in claim 8 wherein said output circuit includes a triode having anode and cathode load resistors, one output being from the anode and the other output being from the cathode thereof, and the input from said memory and driver circuit being to the grid of said triode.

10. A circuit combination for use in a dynamic range rate generator tester as set forth in claim 9 wherein said lock-out circuit includes a triode having a grid constituting said input, said grid having a charge and timed discharged network coupled thereto to function to produce pulses on the anode thereof for the first in the periodic series of counter output pulses corresponding to said marker pulse and for biasing said triode to cutoff for the remainder of each periodic series of pulses applied to said grid.

11. A circuit combination for use in a dynamic range rate generator tester as set forth in claim 10 wherein said pulse counter circuit is a binary counter of four counters to produce an output pulse on the count of eight and sixteen pulses.

No references cited.

CHESTER L. JUSTUS, *Examiner.*

ARTHUR GAUSS, *Primary Examiner.*